United States Patent
Kaufman et al.

(10) Patent No.: US 7,063,471 B2
(45) Date of Patent: Jun. 20, 2006

(54) ACCESS CONTROL APPARATUS

(75) Inventors: Peter Kaufman, Santa Barbara, CA (US); Garrett Kaufman, Carpinteria, CA (US); John C. Echols, Santa Barbara, CA (US)

(73) Assignee: Essex Electronics, Inc., Carpinteria, CA (US)

( * ) Notice: Subject to any disclaimer, the term of this patent is extended or adjusted under 35 U.S.C. 154(b) by 218 days.

(21) Appl. No.: 10/850,538

(22) Filed: May 20, 2004

(65) Prior Publication Data

US 2004/0247363 A1 Dec. 9, 2004

Related U.S. Application Data

(60) Provisional application No. 60/471,873, filed on May 20, 2003.

(51) Int. Cl.
 *B41J 5/08* (2006.01)
 *B41J 5/10* (2006.01)
(52) U.S. Cl. ............... 400/472; 200/292; 400/473
(58) Field of Classification Search ............. 400/472, 400/473, 477; 200/292, 512; 361/748
See application file for complete search history.

(56) References Cited

U.S. PATENT DOCUMENTS

| 4,520,248 | A | * | 5/1985 | Woelfel | 200/514 |
| 5,138,119 | A | * | 8/1992 | Demeo | 200/5 A |
| 5,357,065 | A | * | 10/1994 | Mitamura et al. | 200/5 A |
| 5,674,018 | A | * | 10/1997 | Kaufman et al. | 400/473 |
| D491,087 | S | * | 6/2004 | Kaufman et al. | D10/106 |

* cited by examiner

*Primary Examiner*—Stephen Meier
*Assistant Examiner*—Marissa Ferguson-Samreth
(74) *Attorney, Agent, or Firm*—John K. McCulloch

(57) ABSTRACT

A keypad unit for an access system including an outer housing having an integral bezel. A carrier is mounted within the housing, and an overlay including key zones is mounted to the carrier. A PCB assembly is suspended within the carrier by a non-compressive, but compliant encapsulating compound. The PCB assembly includes a foam layer sandwiched between a top PCB and a bottom PCB. LEDs are electrically coupled to a top surface of the top PCB. Piezoelectric transducers are mounted to the top PCB and are backed by the foam layer. The carrier may include carrier projections are in register with the key zones on the overlay and the transducers. When an operator pushes a key zone, the corresponding projection transmits the force via the carrier and the encapsulating compound to the carrier adjacent the corresponding transducer causing it to generate a voltage indicative of the pressure zone at which the force was applied.

22 Claims, 2 Drawing Sheets

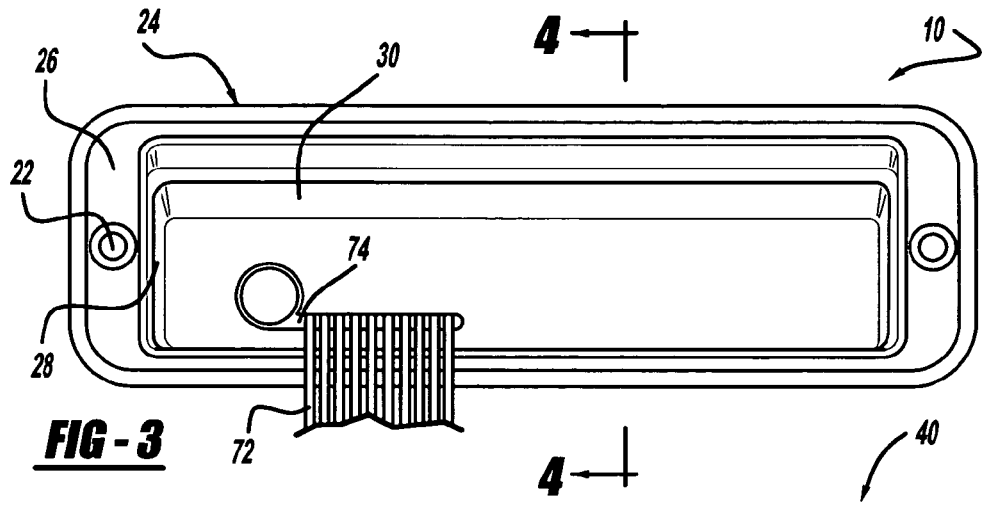
FIG - 3
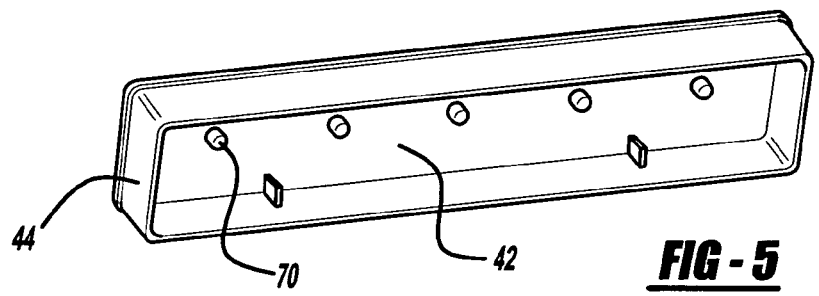
FIG - 5
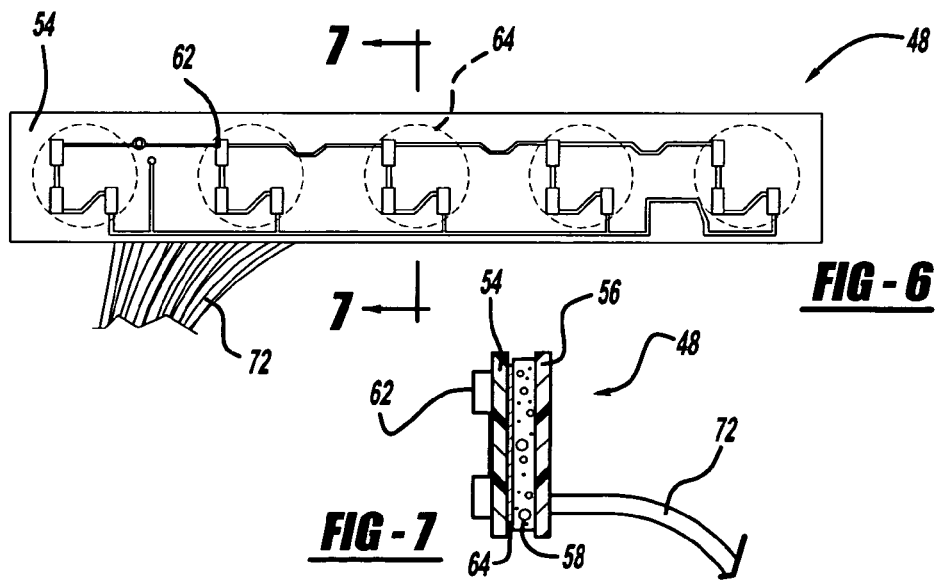
FIG - 6
FIG - 7

ACCESS CONTROL APPARATUS

CROSS REFERENCE TO RELATED APPLICATIONS

This application claims the benefit of the filing date of U.S. Provisional Application No. 60/471,873, titled "Access Control Apparatus," filed May 20, 2003.

BACKGROUND OF THE INVENTION

1. Field of the Invention

This invention relates generally to a keypad unit and, more particularly, to a keypad unit for controlling access to a vehicle, compartment, premises, or other areas to which access desirability is restricted to authorized personnel.

2. Discussion of the Related Art

Access control systems for vehicles and the like sometimes employ a keypad unit mounted to a vehicle door. The vehicle operator may apply touch pressure to keys on the keypad unit in a predetermined number sequence, which will in turn unlock the door. Because these keypad units are employed on the outside of the vehicle, they are subject to weather conditions and potential vandalism. Therefore, keypad unit designs require that the keypad unit be adequately sensitive to a person's touch, and be weather resistant and tamper resistant. A keypad unit of the general type to which the invention relates is disclosed in U.S. Pat. No. 5,674,018 issued Oct. 7, 1997 to Kaufman et al.

SUMMARY OF THE INVENTION

A keypad unit constructed in accordance with the present invention includes an outer housing having an integral bezel. A carrier is mounted within the housing and an overlay including numbered zones is mounted to a top surface of the carrier. A PCB assembly is suspended within the carrier by a non-compressive, but compliant encapsulating compound so that the PCB assembly is hermetically sealed and is positioned away from the carrier. The PCB assembly includes at least one PCB and a compressive layer. LEDs are electrically coupled to a top surface of the PCB. Piezoelectric transducers are mounted to the PCB and are backed by the compressive layer. In one embodiment, the carrier includes carrier projections oriented relative to the numbered zones and the piezoelectric transducers. When an operator pushes on one of the zones, the corresponding projection on the carrier transfers the force to the piezoelectric transducer, which flexes relative to the compressive layer, causing it to generate a voltage indicative of the site of the applied force.

Additional advantages and features of the present invention will become apparent from the following description and appended claims, taken in conjunction with the accompanying drawings.

BRIEF DESCRIPTION OF THE DRAWINGS

FIG. 3 is a front view of a housing of the keypad unit shown in FIG. 1 separated from the vehicle;

FIG. 5 is a rear isometric view of a circuit board carrier removed from the keypad unit shown in FIG. 1;

FIG. 6 is a top view of a printed circuit board (PCB) assembly employed in the keypad unit shown in FIG. 1; and FIG. 7 is a cross-sectional view of the PCB assembly shown in FIG. 6.

DETAILED DESCRIPTION OF THE EMBODIMENTS

The following discussion of the embodiments of the invention directed to a keypad unit for an access system associated with a vehicle is merely exemplary in nature, and is in no way intended to limit the invention or its applications or uses.

Figure 1:
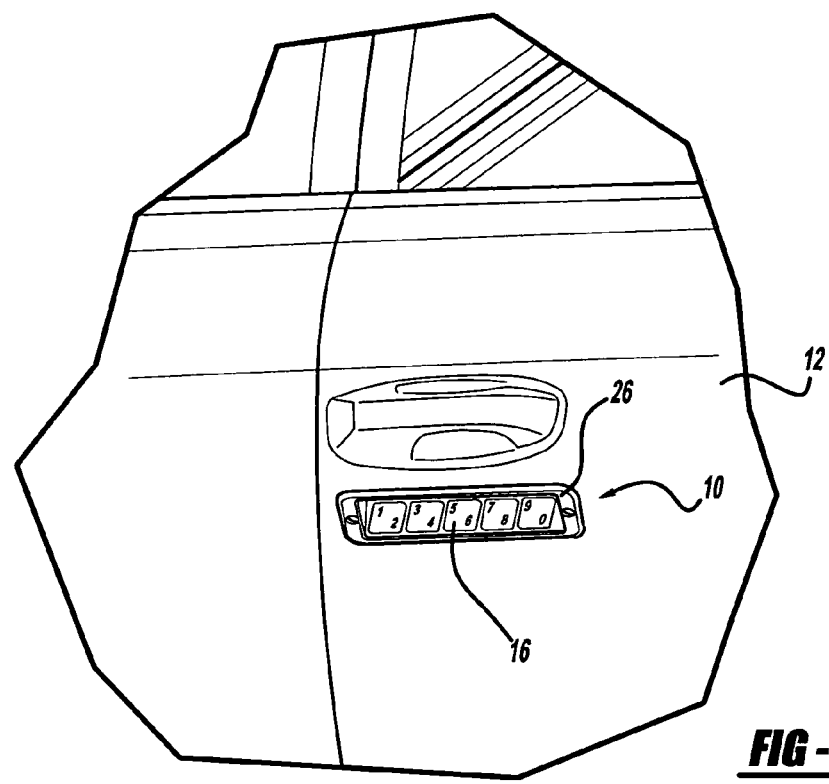
FIG. 1 is an isometric view of a keypad unit of the kind adapted for use with a vehicle, where the keypad unit is mounted to a vehicle door.
Figure 2:
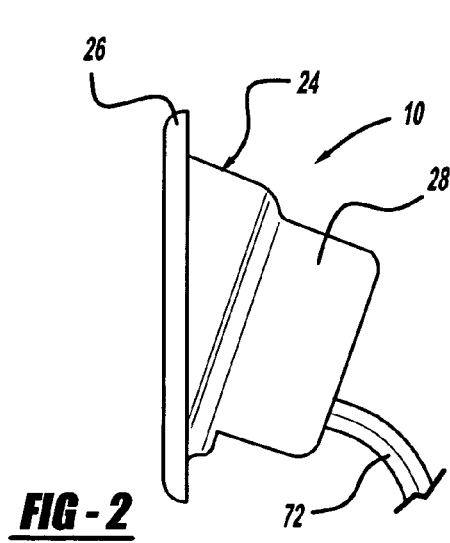
FIG. 2 is an end view of the keypad unit shown in FIG. 1 separated from the vehicle.
Figure 4:
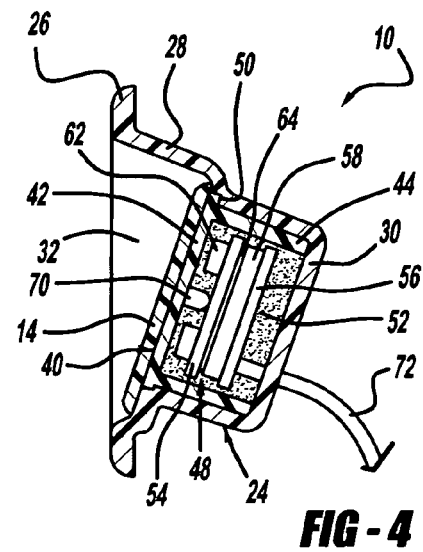
FIG. 4 is a cross-sectional view through line 44 in FIG. 3 of the keypad unit.

FIG. 1 is an isometric view of a keypad unit 10 that is part of an access system for a vehicle. The keypad unit 10 is shown mounted to a vehicle door 12. However, as will be appreciated by those skilled in the art, the keypad unit 10 can be mounted to other parts of the vehicle, or be employed in systems other than an access system for a vehicle. FIG. 2 is an end view and FIG. 4 is a cross-sectional view of the keypad unit 10 separated from the door 12. The keypad unit 10 includes an overlay 14 having a plurality of indicia or key zones 16, where the key zones 16 include numbers or other indicia. In this embodiment, there are five key zones 16, each including two numbers. An operator will enter a predetermined number code by pressing the zones 16 in a certain sequence. By pressing the proper sequence of the zones 16, the unit 10 will cause the access system to unlock the door 12.

The unit 10 includes an outer housing 24 having a mounting flange or bezel 26, a sidewall 28 and a rear wall 30 that combine to define an internal cavity 32. FIG. 3 is a front view of the housing 24. The bezel 26 is supported on the exterior of the vehicle door 12 by bolts positioned within holes 22 extending through the bezel 26. The arrangement of the bezel 26, the sidewall 28 and the rear wall 30 are such to enable the zones 16 to be visible to the vehicle operator. The housing 24 is made of any suitable opaque metal or plastic that is molded as a single piece unit to provide the desired rigidity.

The unit 10 further includes an internal carrier 40 having a deflectable force transmitting top wall 42 and sidewalls 44 which, together, form a cavity closed at its rear by the rear wall 30 of a housing 24. FIG. 5 is a rear isometric view of the carrier 40 separated from the unit 10. In one embodiment, the carrier 40 is a molded plastic resin, such as a nylon resin. This molded resin is highly impact resistant, UV resistant, and is able to allow an encapsulating compound, discussed below, to be readily adhered to it. The carrier 40 may be translucent or transparent to allow light to pass through it. The top wall 42 seats on a shoulder 50. The overlay 14 is mounted to a top surface of the top wall 42 by, for example, a double-sided piece of adhesive tape. In an alternate embodiment, the overlay 14 can be eliminated, and indicia can be formed on either side of the top wall 42 of the carrier 40 by any suitable technique.

A PCB assembly 48 is suspended within the carrier 40 by a non-compressive, but compliant (non-rigid) encapsulating compound 52. The assembly 48 and the compound 52 completely fill the carrier cavity, thereby precluding any lateral expansion of the compound 52. The compound 52 is non-compressive, but compliant in that a force applied to the compound 52 is transmitted throughout the compound 52 without the compound 52 compressing within the closed or contained environment. The compound 52 is also translucent or transparent to allow light to pass through it. In one embodiment, the compound 52 is an encapsulating resin, such as an unfilled, cast epoxy, having a Shore hardness within a selected range of between 20 and 80. A shore hardness of about A50 is satisfactory. the compound also may have a density of about 8.8 wpg and a compressive strength of about 425 psi. By suspending the PCB assembly 48 in the compound 52 within the cavity of the carrier 40, the fragile components of the unit 10 are protected from the environment and spaced from the carrier walls.

FIG. 6 is a top view of the PCB assembly 48 and FIG. 7 is a cross-sectional view of the PCB assembly 48 separated from the unit 10. The PCB assembly 48 includes a top PCB 54 and a bottom PCB 56 separated by a resiliently compressive layer 58 formed from suitable material such as a closed cell acrylic foam. A series of LEDs 62 are electrically coupled to the top PCB 54 and are in register with the key zones 16 to illuminate them in low ambient conditions. In one embodiment, the overlay 14 is opaque and the indicia on the key zones 16 is translucent so that light from the LEDs 62 illuminates the indicia through the compound 52 and the carrier 40. The PCBs 54 and 56 include electrical components suitable for the operation of the unit 10, such as those disclosed in the '018 patent.

A series of transducers 64 are mounted to the rear surface of the PCB 54 and are also oriented relative to the key zones 16. In an alternate embodiment, the transducers 64 can be mounted to the top surface of the PCB 54. The transducers 64 can be any transducer suitable for the purposes described herein, such as a piezoelectric bender or force sensitive resistor. A piezoelectric bender includes a piezoelectric wafer sandwiched between a pair of electrodes. Piezoelectric benders suitable for use in the embodiment disclosed herein are disclosed in the '018 patent. As is well understood in the art, deformation or compression of the transducer 64 generates a voltage. When the transducers 64 are flexed against the compressive layer 58, a signal is sent to the appropriate circuitry on the PCB 56. The sequence of flexing the transducers 64 generates a code that is processed to open the door 12 by the access system. Wires 72 electrically coupled to the PCB 56 extend through the compound 52 and a tightly fitting opening 74 in the rear wall 30 of the housing 24, as shown, to be connected to the access system.

The transducers 64 are positioned against and backed by the compressive layer 58 and are encapsulated by the compound 52. The compressive layer 58 is secured to the PBC 54 by a suitable adhesive. The compressive layer 58 also prevents the compound 52 from contacting the transducers 64, which otherwise could adversely affect the transducers' ability to flex in response to the application of force by the operator. In an alternate embodiment, the transducers 64 can be compression transducers, and the compressive layer 58 can be eliminated. Also, in other embodiments, the PCB 56 can be eliminated, and its electronics supported on the PCB 54, or the PCB 56 can be outside of the unit 10.

As discussed above, the transducers 64 are intended to flex in response to force applied to the key zones 16. In one embodiment, the carrier 40 employs a series of carrier projections 70 that are in register with the key zones 16 and the respective transducers 64, as shown. When the operator applies force to the key zone 16, the projection 70 bears and transmits the force to the top surface of the PCB 54 at the appropriate location, which causes the transducer 64 to flex against the compressive layer 58. The transducer 64 generates the voltage signal that indicates one of the key zones 16 has been pressed. It is stressed, however, that the projections 70 assist, but are not required in the transfer of force to the transducers 64.

The construction of the keypad unit 10, including the confined compound 52, allows the unit 10 to experience the application of excessive force abuse and prolonged use without the unit 10 failing or becoming damaged. The compressive layer 58 is combined within the carrier 40, and the PCB assembly 48 is suspended within the encapsulating compound 52 away from the operable surface of the overlay 14. The PCB assembly 48 including the transducers 64, is thus separated from the surface of the unit 10 within a compliant boundary layer.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A keypad unit for an access system, said unit comprising:
    an outer housing having walls defining a housing cavity;
    an internal carrier mounted within the housing cavity, said internal carrier including walls defining a carrier cavity means forming a plurality of indicia zones overlying said carrier;
    a circuit board assembly including a resiliently compressive layer and at least one circuit board having a plurality of transducers; and
    a non-compressive, but compliant encapsulating compound confined within the carrier cavity, said circuit board assembly being suspended within the encapsulating compound, said compressive layer separating the encapsulating compound from said transducers.

2. The unit according to claim 1 wherein the encapsulating compound has a hardness within the range of between about Shore A 20 and 80.

3. The unit according to claim 1 wherein the encapsulating compound is a cast resin.

4. The unit according to claim 1 wherein the compressive layer is a foam layer.

5. The unit according to claim 4 wherein the foam layer is an acrylic material.

6. The unit according to claim 1 including an overlay overlaying said transducers, said overlay comprising a flexible, non-compressive material.

7. The unit according to claim 1 wherein the internal carrier includes a plurality of carrier projections extending into the carrier cavity and in register with the transducers.

8. The unit according to claim 1 wherein said encapsulating compound is wholly confined within said carrier cavity.

9. The unit according to claim 1 wherein the keypad unit is applicable to be mounted to a door of a vehicle, and the access system is a vehicle access system.

10. A keypad unit for an access system, said unit comprising:
    an outer housing;
    an internal carrier mounted within the housing and defining a carrier cavity;
    a printed circuit board assembly including at least one printed circuit board, said at least one printed circuit board including a plurality of piezoelectric transducers; and a non-compressive, but compliant encapsulating compound contained within the carrier cavity, said printed circuit board assembly being suspended within the encapsulating compound.

11. The unit according to claim 10 further comprising a resiliently compressive layer positioned between the transducers and the encapsulating compound.

12. The unit according to claim 11 wherein the compressive layer is a foam layer.

13. The unit according to claim 10 wherein the encapsulating compound is a translucent or transparent cast resin and has a hardness within the range of about Shore A 20 to Shore A 80.

14. The unit according to claim 13 wherein the encapsulating compound has a hardness of about Shore A50.

15. The unit according to claim 10 further comprising an overlay overlying a top wall of the carrier, said overlay including a plurality of key zones.

16. The unit according to claim 15 wherein the overlay is a flexible, non-compressive polyurethane layer.

17. The unit according to claim 10 wherein the internal carrier includes a plurality of carrier projections extending into the carrier cavity and in register with the transducers and the key zones.

18. The unit according to claim 10 wherein the keypad unit is applicable to be mounted to a door of a vehicle, and the access system is a vehicle access system.

19. A keypad unit for an access system associated with a vehicle, said keypad unit having means for mounting said unit to a vehicle door, said unit comprising:

an outer housing defining a housing cavity and having an integral bezel;

a transparent or translucent internal carrier mounted within the housing cavity, said internal carrier including a top wall and sidewalls defining a carrier cavity, said carrier further including a plurality of carrier projections extending into the carrier cavity;

an overlay mounted to an outside surface of the top wall of the carrier, said overlay including a plurality of key zones in register with the carrier projections;

a printed circuit board assembly including a resilient foam layer sandwiched between a top printed circuit board and a bottom printed circuit board, said top printed circuit board including a plurality of LEDs positioned between the top wall of the carrier and the printed circuit board assembly where the LEDs are in register with the key zones, said top printed circuit board further including a plurality of piezoelectric transducers mounted to the top printed circuit board and backed by the foam layer, said piezoelectric transducers being in register with the carrier projections; and a non-compressive, but compliant encapsulating compound combined within the carrier cavity, said printed circuit board assembly being suspended within the encapsulating compound and being spaced from all walls of the carrier.

20. The unit according to claim 19 wherein the encapsulating compound is a translucent or transparent cast resin.

21. The unit according to claim 19 wherein the overlay is a flexible, non-compressive polyurethane layer.

22. The unit according to claim 19 wherein the encapsulating compound has a hardness within the range of about Shore A 50.

* * * * *